US007124576B2

(12) United States Patent
Cherney et al.

(10) Patent No.: US 7,124,576 B2
(45) Date of Patent: Oct. 24, 2006

(54) HYDRAULIC ENERGY INTENSIFIER

(75) Inventors: Mark John Cherney, Potosi, WI (US); Daniel Dean Radke, Dubuque, IA (US)

(73) Assignee: Deere & Company, Moline, IL (US)

( * ) Notice: Subject to any disclaimer, the term of this patent is extended or adjusted under 35 U.S.C. 154(b) by 5 days.

(21) Appl. No.: 10/962,627

(22) Filed: Oct. 11, 2004

(65) Prior Publication Data

US 2006/0075749 A1 Apr. 13, 2006

(51) Int. Cl.
*F16D 31/02* (2006.01)

(52) U.S. Cl. .......................................................... 60/414

(58) Field of Classification Search .................. 60/413, 60/414; 91/5

See application file for complete search history.

(56) References Cited

U.S. PATENT DOCUMENTS 4,646,518 A * 3/1987 Hochsattel .................. 60/413
5,046,309 A 9/1991 Yoshino ...................... 60/445
6,584,769 B1 7/2003 Bruun ......................... 60/414
6,655,136 B1 * 12/2003 Holt et al. ..................... 60/414
6,739,127 B1 * 5/2004 Nippert et al. ................ 60/414
6,748,738 B1 * 6/2004 Smith .......................... 60/414
2005/0066655 A1 * 3/2005 Aarestad et al. .............. 60/413

OTHER PUBLICATIONS

Glenn R. Wendel, Southwest Research Institute, San Antonio, Texas, 100-8.2, Regenerative Hydraulic Systems for Increased Efficiency.

* cited by examiner

*Primary Examiner*—Thomas E. Lazo

(57) ABSTRACT

Hydraulic circuits used to manipulate tools in, for example construction equipment, uses less power for a retraction of a hydraulic cylinder than for an extension of that cylinder. Provided is a hydraulic circuit that uses the stored energy from the low energy phase to lower the energy load on the hydraulic pump during the high energy phase. Energy from the hydraulic pump is increased during the low energy phase to increase the amount of stored hydraulic energy. The increased amount of stored energy is then used to intensify or add to the energy generated by the hydraulic pump for the high energy phase.

35 Claims, 3 Drawing Sheets

HYDRAULIC ENERGY INTENSIFIER

FIELD OF THE INVENTION

The invention relates to an energy recovery circuit for a hydraulic apparatus of a work vehicle such as a loader, a backhoe or the like.

BACKGROUND OF THE INVENTION

In modern work vehicles, hydraulic circuits are used to power the hydraulic cylinders that manipulate work implements. Such systems may use pumps of the variable displacement type which control the flow rate of hydraulic fluid via manipulation of their displacement volumes. A displacement control valve is used to determine the direction of fluid flow to accomplish the desired work, i.e., for example, to positively extend or retract a double acting hydraulic cylinder. The displacement control valve is also used to allow free flow of fluid so as to minimize pressure generated, i.e., to enable floating; an operating mode in which an implement rests on and follows the contours of the earth as the work vehicle is propelled along the ground.

When a hydraulic cylinder is used to manipulate a tool or load against a resisting force such as gravity, the hydraulic pump for the associated hydraulic system, in a vast majority of cases, generates substantially less energy in moving to a retracted position than in moving to an extended position. This is generally due to the fact that the cylinder retracts under an action of gravity, but may extend only when the hydraulic cylinder overcomes the action of gravity. Moreover, the hydraulic cylinder uses less fluid and tends to generate less force during a retraction than during an extension as the internal volume and the area of application for generating a force load on the piston are smaller on the retracting side than on the extending side of the piston. Thus a hydraulic cylinder retraction may be generally characterized as a low energy phase of the hydraulic cylinder and an extension may be generally characterized as a high energy phase of the hydraulic cylinder.

SUMMARY OF THE INVENTION

As stated earlier, in some conventional hydraulic systems for work vehicles a portion of the hydraulic energy from the low energy phase is stored for application to some other function in the work vehicle. However, in conventional work vehicles, the stored hydraulic energy is not used to lower the energy load on the hydraulic pump supplying hydraulic energy to the cylinder. Thus, in conventional work vehicles, the peak energy requirements of the high energy phase directly determine the size, capacity and energy requirements of the hydraulic pump and, thusly, the overall fuel efficiency of the hydraulic circuit.

Provided herein is a hydraulic circuit that uses the stored energy from the low energy phase to lower the energy load on the hydraulic pump during the high energy phase. Energy from the hydraulic pump is increased during the low energy phase to increase the amount of stored hydraulic energy. The increased amount of stored energy is then used to intensify the energy generated, by the hydraulic pump, for the high energy phase. The use of the stored energy in this manner tends to narrow the difference between the energy loads on the hydraulic pump during the low and high energy phases. This makes it possible to reduce the hydraulic pump size and benefit from increased fuel efficiency without a consequential reduction in performance for the hydraulic circuit. It also makes it possible to increase the performance of the hydraulic circuit, or reduce the size of an engine driving the hydraulic circuit, without a consequential reduction in fuel efficiency.

BRIEF DESCRIPTION OF THE DRAWINGS

Embodiments of the invention will be described in detail, with references to the following figures, wherein.

DESCRIPTION OF THE ILLUSTRATED EMBODIMENT

Figure 1:
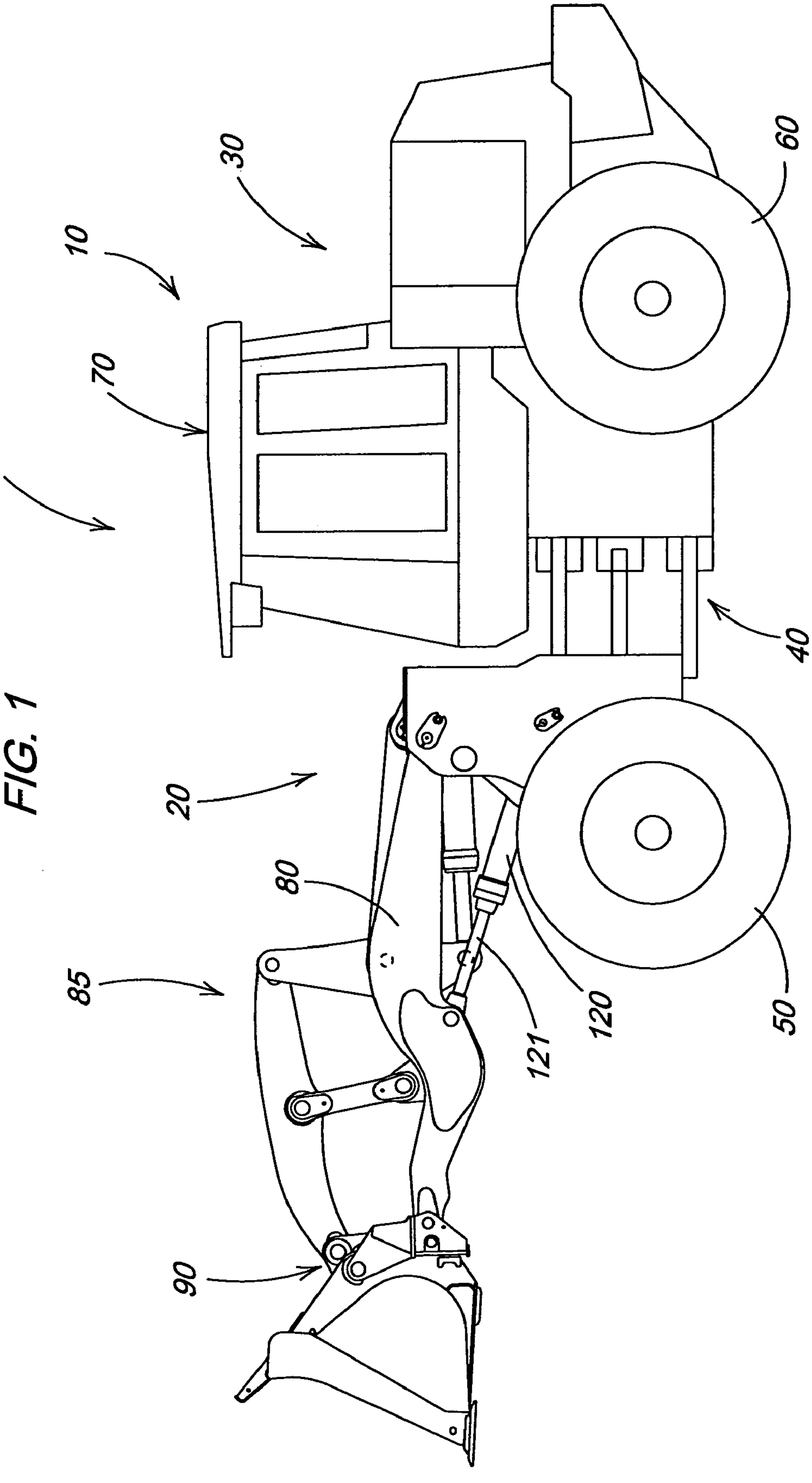
FIG. 1 is a view of a work vehicle in which the invention may be used.

FIG. 1 illustrates a work vehicle in which the invention may be used. The particular work vehicle illustrated in FIG. 1 is an articulated four wheel drive loader 1 having a main vehicle body 10 that includes a front vehicle portion 20 pivotally connected to a rear vehicle portion 30 by vertical pivots 40, the loader being steered by pivoting of the front vehicle portion 20 relative to the rear vehicle portion 30 in a manner well known in the art. The front and rear vehicle portions 20 and 30 are respectively supported on front drive wheels 50 and rear drive wheels 60. An operator's station 70 is provided on the rear vehicle portion 30 and is generally located above the vertical pivots 40. The front vehicle portion 20 includes a boom 80, a linkage assembly 85, a work tool 90 and a hydraulic cylinder 120. The front and rear drive wheels 50 and 60 propel the vehicle along the ground and are powered in a manner well known in the art.

Figure 2:
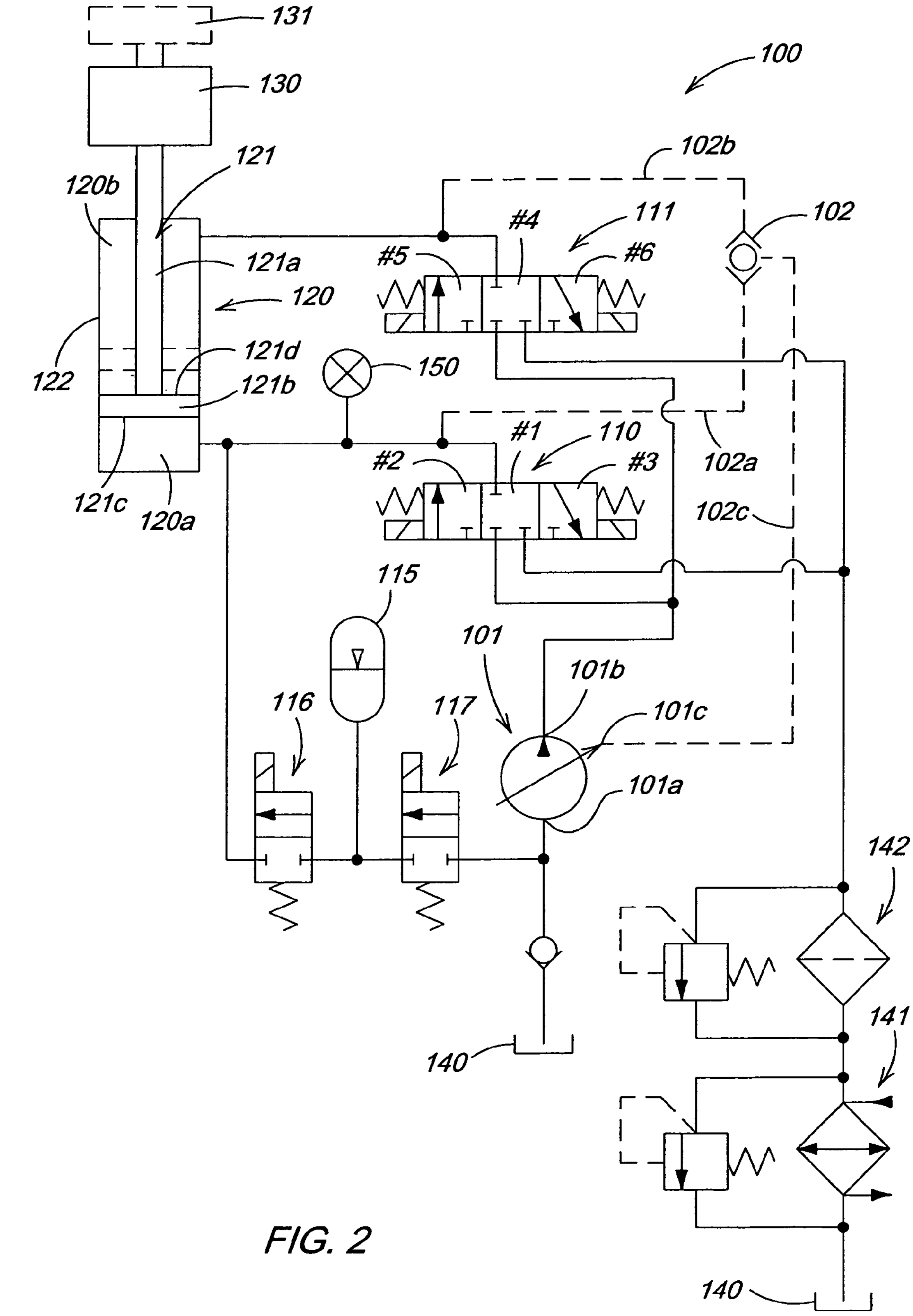
FIG. 2 is a diagram of an exemplary embodiment of the hydraulic circuit of the invention for the work vehicle in FIG. 1.

FIG. 2 illustrates a hydraulic circuit 100 representing an exemplary embodiment of the invention. The hydraulic circuit 100 illustrated includes: a load sensitive variable displacement pump 101; a shuttle check valve 102; a first displacement control valve 110; a second displacement control valve 111; an accumulator 115; an accumulator charge valve 116; an accumulator discharge valve 117; and the hydraulic cylinder 120. The load sensitive variable displacement pump 101 includes a pump inlet 101*a*, a pump outlet 101*b*, and a sensor inlet 101*c*. The hydraulic cylinder 120 includes a first chamber 120*a*, a second chamber 120*b*, a cylinder rod 121, and a housing 122. The cylinder rod 121 includes a piston rod 121*a* that is connected to a piston 121*b*, the piston 121*b* having a first application surface 121*c* and a second application surface 121*d* that is smaller than the first application surface 121*c* by at least the cross sectional area of the connecting piston rod 121*a*. The first and second chambers 120*a* and 120*b* include portions of the hydraulic cylinder 120 that are exposed to the first and second application surfaces 121*c* and 121*d*, respectively.

The hydraulic cylinder 120 is partially rated by an area ratio defined as the ratio of a first surface area for the first application surface 121*c* to a second surface area for the second application surface 121*d*. An extension load 130 represents a load on the cylinder rod 121. The extension load 130, which is encountered during an extension of the hydraulic cylinder 120, is usually greater than a retraction load 131, encountered during a retraction of the hydraulic cylinder 120.

The hydraulic pump 101 is fluidly connected to the first displacement control valve 110 and the second displacement control valve via the outlet 101*b*. The hydraulic pump is fluidly connected to the accumulator discharge valve 117 via the inlet 101*a*. The first displacement control valve 110 is in fluid communication with the first chamber 120*a* and with the accumulator charge valve 116. The second displacement control valve 111 is in fluid communication with the second chamber 120*b*. The accumulator 115 is in fluid communication with the accumulator charge valve 116 and the accumulator discharge valve 117. The accumulator charge valve 116 is in fluid communication with the accumulator discharge valve 117. Finally, the check valve 102 is fluidly connected to the first chamber 120*a*, the second chamber 120*b* and the sensor inlet 101*c* via pilot lines 102*a*, 102*b* and 102*c* respectively.

The first displacement control valve 110 and the second displacement control valve 111 are three position, three way valves with normally closed centers. The shuttle check valve 102 is double action in that it stops the flow of the highest of the pilot pressures from the first side 120*a* and the second side 120*b* and delivers the highest pilot pressure, or load sensor, to the load sensor inlet 101*c*. Two single action check valves (not shown) would accomplish the same function. The accumulator charge valve 116 and the accumulator discharge valve 117 are two position, one way valves that are normally closed.

In operation, to extend a retracted cylinder rod 121, the hydraulic pump 101 generates a first hydraulic energy, i.e., displaces a first volume of fluid at a first pressure. As the pump generates the first hydraulic energy, the first displacement control valve 110 is moved to position #2 while the second displacement control valve 111 is shifted to position #6 and the accumulator charge valve 116 remains closed. Fluid at the first pressure then enters the first chamber 120*a* and exerts the first pressure on the first application surface 121*c* generating a first force greater than a second force resulting from a combination of the extension load 130 and a second hydraulic energy exerting a fluid pressure, from the weight of the fluid and any line resistance to flow, on the second application surface 121*d*. The first chamber 120*a* of the hydraulic cylinder 120 is then filled with fluid, extending the hydraulic cylinder 120, and forcing any fluid in the second chamber 120*b* through the second displacement control valve 111, a filter assembly 142, a heat exchanger assembly 141 and into a fluid reservoir 140.

To retract an extended hydraulic cylinder 120, the first displacement control valve is moved to position #1, the second displacement control valve 111 is moved to position #5, the accumulator charge valve 116 is opened and the accumulator discharge valve 117 is closed. The hydraulic pump 101 then generates a second hydraulic energy, i.e., displaces a second volume of fluid at a second pressure. Fluid then enters the second chamber 120*b* exerting the second pressure on the second application surface 121*d* which produces a second force that, when combined with the retraction load 131, is sufficient to overcome a third force from a first chamber reaction pressure on the first application surface 121*c*. The first chamber reaction pressure is produced by a reaction to the second force in combination with the retraction load 131 via, inter alia, a resistance to flow in the hydraulic lines and an accumulator reaction pressure in the accumulator 115. Fluid then flows into the second chamber 120*b*, retracting the hydraulic cylinder 120 and forcing fluid out of the first chamber 120*a*, through the accumulator charge valve 116 and into the accumulator 115. The accumulator 115 continues to capture pressurized fluid until a full volume of fluid is captured or the accumulator reaction pressure is equal to or greater than the first chamber reaction pressure. Thus the accumulator 115 stores a third hydraulic energy as it stores the fluid, i.e., the accumulator 115 stores the fluid from the first side 120*a* under the accumulator reaction pressure.

If desired, a pressure transducer 150 between the first chamber 120*a* and the first displacement control valve 110 may be set to signal a controller (not shown) to move the first displacement control valve 110 to position #3 and close the charge valve 116 when once the first chamber reaction pressure is reached. This allows the first chamber 120*a* to be fully emptied and hydraulic cylinder to be fully retracted.

The pre-charge on the accumulator is usually adjusted such that the first reaction pressure will be sufficient to allow storage of the entire volume of fluid contained in the first side 120*a* of the hydraulic cylinder 120 with the cylinder rod 121 fully extended. However, the accumulator 115 may be pre-charged to higher pressures requiring the hydraulic pump 101 to generate higher second pressures. Additionally, the pre-charge may be adjusted to allow only a certain or pre-defined volume of fluid to be stored in the accumulator 115. Naturally, in this embodiment, a higher pre-charge on the accumulator allows a greater amount of hydraulic energy to be stored in the accumulator 115 as hydraulic energy is a function of pressure and volume.

During the next extension of the cylinder rod 121, the accumulator discharge valve 117 is opened to release the third hydraulic energy stored in the accumulator 115 and apply the accumulator reaction pressure to the pump inlet 101*a* of the hydraulic pump 101 to reduce the pressure differential between the pump inlet 101*a* and the pump outlet 101*b* and, consequently, reduce the demand on the hydraulic pump 101 during the extension. This results in a decrease in the peak demand on the hydraulic pump 101. It also tends to level all demands on the hydraulic pump 101 for extending and retracting the hydraulic cylinder 120 and could lead to a decrease in the size and energy requirements of the engine (not shown) without a consequential loss in performance for the hydraulic circuit 100.

All valve operations, including those of the accumulator charge valve 116 and the accumulator discharge valve 117, result from electrical signals that are automatically generated as the controls for functioning the hydraulic cylinder 120 are manipulated.

A maximum reduction in peak demand and, consequently, an optimal leveling of all demands on the hydraulic pump 101 as well as a reduction in size of the engine (not shown) may be accomplished by adjusting the pre-charge on the accumulator 115 to require the maximum second hydraulic energy to be approximately equal to the maximum first hydraulic energy. Such could, for example, be accomplished by choosing the maximum load 130 the hydraulic cylinder 120 will handle, determining the retraction load 131 the hydraulic circuit will experience on retraction of the hydraulic cylinder 120, ascertaining the area ratio of the hydraulic cylinder 120, and pre-charging the accumulator accordingly. For example, the pre-charge may be adjusted such that $H_{2max}/AR+H_G \cong H_{1max}$, where $H_{2max}$ is the maximum second hydraulic energy, AR is the area ratio, $H_G$ is a hydraulic energy produced by the action of gravity, $H_{1max}$ is the maximum first hydraulic energy, and $H_{2max} \cong H_{1max}$. Under these circumstances, $(P_{2max}A_2+F_{RG})/A_1>=P_{RAmax}$, where $P_{2max}$ is the second pressure, $A_2$ is the second surface area, $F_{RG}$ is the force from the action of gravity, $A_1$ is the first surface area, and $P_{RAmax}$ is the accumulator reaction pressure.

Work tool float is accomplished by moving the first and second displacement control valves 110 and 111 to positions #3 and #6 respectively. This allows fluid to freely flow between the reservoir and the chambers 120*a* and 120*b*.

Figure 3:
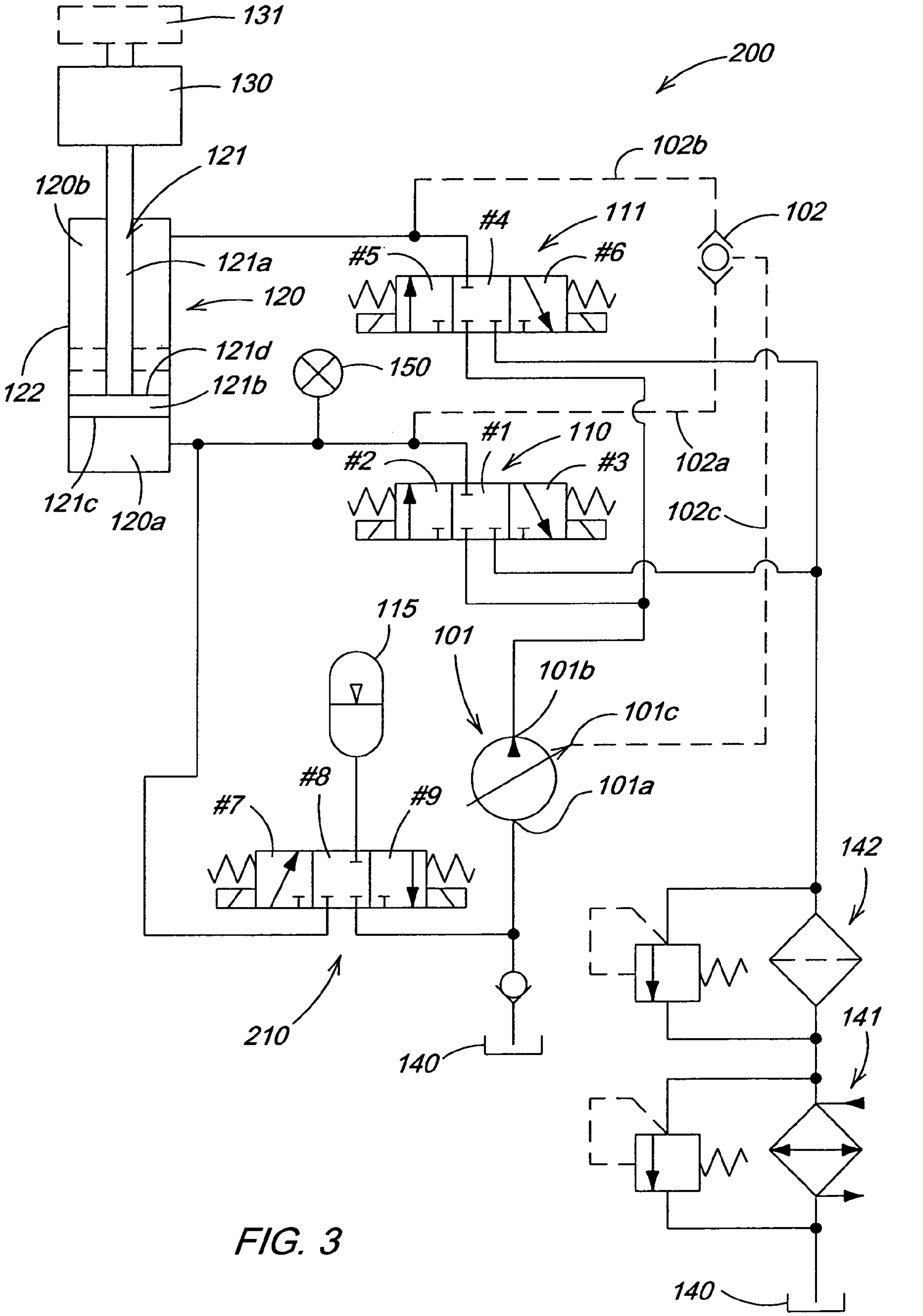
FIG. 3 is a diagram of another exemplary embodiment of the hydraulic circuit of the invention for the work vehicle in FIG. 1.

FIG. 3 illustrates another hydraulic circuit 200 as an exemplary embodiment of the invention in which the accumulator charge valve 116 and the accumulator discharge valve 117 are replaced by a single accumulator valve 210. The accumulator valve 210 is moved to a charge position #7 when the accumulator 115 is being filled with fluid from the first chamber 120*a*. The accumulator valve 210 is then moved to charge position #8 once the accumulator 115 is charged. Finally the accumulator valve 210 is moved to position #9 to release the fluid stored in the accumulator 115 at the accumulator reaction pressure and apply it to the pump inlet 101*a* of the hydraulic pump 101.

Having described the illustrated embodiment, it will become apparent that various modifications can be made without departing from the scope of the invention.

What is claimed is:

1. A hydraulic energy intensifying circuit for a work vehicle, the work vehicle including a frame, a tool, a linkage between the frame and the tool, a boom between the frame and the tool, a hydraulic cylinder to manipulate the tool, the hydraulic cylinder having a first chamber and a second chamber, the hydraulic cylinder extending against a first load under an application of a first volume of fluid at a first pressure to the first chamber, the hydraulic cylinder retracting under a second load and an application of a second volume of fluid at a second pressure to the second chamber, a first chamber reaction pressure being produced in the first chamber when the hydraulic cylinder is retracting, the hydraulic energy intensifying circuit comprising:

a hydraulic pump to displace the first volume of fluid at the first pressure and the second volume of fluid at the second pressure, the hydraulic pump having a pump inlet;

at least one displacement control valve to direct the first volume of fluid to the first chamber to extend the cylinder rod and the second volume of fluid to the second chamber to retract the cylinder rod on demand, the at least one displacement control valve capable of blocking fluid flow from the first chamber;

an accumulator capable of storing a predefined volume of fluid from the first chamber of the hydraulic cylinder under an accumulator reaction pressure, the predefined volume being determined when the hydraulic cylinder is in an extended position, the accumulator being pre-charged to a first pre-charge pressure that allows the predefined volume of fluid to be stored in the accumulator when the second volume of fluid at the second pressure is applied to the second chamber in combination with the second load;

at least one accumulator valve to allow the predefined volume of fluid from the first chamber to be stored in the accumulator, the at least one accumulator valve allowing the fluid stored in the accumulator under the accumulator reaction pressure to be released from the accumulator, the at least one displacement control valve directing the second volume of fluid from the hydraulic pump to the second chamber and blocking the fluid flow from the first chamber to, thereby, divert the fluid flow from the first chamber to the at least one accumulator valve, the at least one accumulator valve opening to allow the predefined volume of fluid from the first chamber to be stored in the accumulator, the accumulator storing the predefined volume of fluid at the accumulator reaction pressure.

2. The hydraulic energy intensifying circuit of claim 1, wherein the at least one accumulator valve comprises:

an accumulator charge valve to allow the fluid from the first chamber to be stored in the accumulator; and an accumulator discharge valve to allow the fluid stored in the accumulator under the accumulator reaction pressure to be released from the accumulator; the at least one displacement control valve directing the second volume of fluid from the hydraulic pump to the second chamber and blocking the fluid flow from the first chamber to, thereby, divert the fluid from the first chamber to the accumulator charge valve, the accumulator charge valve opening to allow the predetermined volume of fluid from the first chamber to be stored in the accumulator, the accumulator storing the predefined volume of fluid at the accumulator reaction pressure.

3. The hydraulic energy intensifying circuit of claim 2, wherein the accumulator discharge valve opens to release the predefined volume of fluid stored in the accumulator.

4. The hydraulic energy intensifying circuit of claim 3 wherein the accumulator reaction pressure is applied to the pump inlet to reduce a load on the pump.

5. The hydraulic energy intensifying circuit of claim 1, wherein the at least one displacement control valve comprises a first displacement control valve and a second displacement control valve, the first displacement control valve directing the first hydraulic energy to the first chamber, the second displacement control valve directing the second hydraulic energy to the second chamber.

6. The hydraulic energy intensifying circuit of claim 1, wherein the hydraulic pump is a load sensitive variable displacement hydraulic pump having a load sensor.

7. The hydraulic energy intensifying circuit of claim 6, further comprising means for delivering a load sense of a first hydraulic pressure on the first chamber and a second hydraulic pressure on the second chamber to the load sensor.

8. The hydraulic energy intensifying circuit of claim 7, wherein the means for delivering the load sense comprises a shuttle check valve.

9. The hydraulic energy intensifying circuit of claim 7, wherein the second load is a retraction load resulting from an action of gravity.

10. The hydraulic energy intensifying circuit of claim 7, wherein the first pressure is the highest pilot pressure.

11. The hydraulic energy intensifying circuit of claim 7, wherein the second pressure is the load sense.

12. The hydraulic energy intensifying circuit of claim 1, wherein the predefined volume of fluid is a full volume of fluid contained in the first chamber of the hydraulic cylinder at a fully extended position.

13. A hydraulic energy intensifying circuit, comprising:

a hydraulic cylinder to manipulate a first load and a second load, the hydraulic cylinder a having a first chamber, a second chamber and a cylinder rod, the cylinder rod having a piston and a piston rod, the piston having a first application surface and a second application surface, the hydraulic cylinder extending against the first load under an application of a first volume of fluid at a first pressure to the first chamber, the first pressure producing a first force as the first pressure is applied against the first application surface, the hydraulic cylinder retracting under a second load and an application of a second volume of fluid at a second pressure to the second chamber, the second pressure producing a second force as the second pressure is applied against the second application surface, a first chamber reaction pressure being produced in the first chamber when the hydraulic cylinder is retracting;

a hydraulic pump to generate the first volume of fluid at the first pressure and the second volume at the second pressure, the hydraulic pump having a pump inlet;

at least one displacement control valve to direct the first volume of fluid at the first pressure to the first chamber and the second volume of fluid at the second pressure to the second chamber, the at least one displacement control valve capable of blocking fluid flow from the first chamber;

an accumulator capable of storing a predefined volume of fluid from the first chamber at an accumulator reaction pressure, the accumulator being pre-charged to a first pressure that allows the predefined volume of fluid to be stored in the accumulator only under the first chamber reaction pressure produced when at least one of the second force is greater than the second load and the second hydraulic energy is applied in combination with the second load;

at least one accumulator valve to allow the predefined volume of fluid to be stored in the accumulator under the first chamber reaction pressure, the at least one accumulator valve allowing the predefined volume of fluid to be released from the accumulator on demand, the at least one displacement control valve directing the second volume of fluid from the hydraulic pump to the second chamber and blocking the fluid flow from the first chamber to, thereby, divert the fluid from the first chamber to the at least one accumulator valve, the at least one accumulator valve opening to allow the predefined volume of fluid from the first chamber to be stored in the accumulator, the accumulator storing the predefined volume of fluid at the accumulator reaction pressure.

14. The hydraulic energy intensifying circuit of claim 13, wherein the at least one accumulator valve comprises:

an accumulator charge valve to allow the fluid from the first chamber to be stored in the accumulator; and an accumulator discharge valve to allow the fluid stored in the accumulator under the accumulator reaction pressure to be released from the accumulator; the at least one displacement control valve directing the second volume of fluid from the hydraulic pump to the second chamber and blocking the fluid flow from the first chamber to, thereby, divert the fluid from the first chamber to the at least one accumulator valve, the accumulator charge valve opening to allow the predefined volume of fluid from the first chamber to be stored in the accumulator, the accumulator discharge valve being closed, the accumulator storing the predefined volume of fluid at the accumulator reaction pressure.

15. The hydraulic energy intensifying circuit of claim 14, wherein the accumulator discharge valve opens to release the predefined volume of fluid stored in the accumulator.

16. The hydraulic energy intensifying circuit of claim 15 wherein the accumulator reaction pressure is applied to the pump inlet to reduce a load on the pump.

17. The hydraulic energy intensifying circuit of claim 13, wherein the at least one displacement control valve comprises a first displacement control valve and a second displacement control valve, the first displacement control valve directing the first volume of fluid to the first chamber, the second displacement control valve directing the second volume of fluid to the second chamber.

18. The hydraulic energy intensifying circuit of claim 13, wherein the hydraulic pump is a load sensitive variable displacement hydraulic pump having a load sensor.

19. The hydraulic energy intensifying circuit of claim 18, further comprising means for delivering a load sense of a first hydraulic pressure at the first chamber and a second hydraulic pressure at the second chamber to the load sensor.

20. The hydraulic energy intensifying circuit of claim 19, wherein the means for delivering the load sense comprises a shuttle check valve.

21. The hydraulic energy intensifying circuit of claim 19, wherein the second load is a retraction load resulting from an action of gravity.

22. The hydraulic energy intensifying circuit of claim 19, wherein the first pressure is greater than the load sense.

23. The hydraulic energy intensifying circuit of claim 19, wherein the second a pressure is greater than the load sense.

24. The hydraulic energy intensifying circuit of claim 13, wherein the predefined volume of fluid is a full volume of fluid contained in the first chamber of the hydraulic cylinder at a fully extended position.

25. A method of intensifying energy in a hydraulic circuit for a work vehicle, the hydraulic circuit including a hydraulic cylinder to manipulate a load, the hydraulic cylinder having a first chamber and a second chamber, the hydraulic cylinder extending against a first load under an application of a first volume of fluid at a first pressure to the first chamber, the hydraulic cylinder retracting under a second load and a second force produced by an application of a second volume of fluid at a second pressure to the second chamber, a first chamber reaction pressure being produced in the first chamber when the hydraulic cylinder is retracting, a hydraulic pump to displace the first volume of fluid at the first pressure and the second volume of fluid at the second pressure, the hydraulic pump having a pump inlet, at least one displacement control valve to direct the first volume of fluid to the first chamber and the second volume of fluid to the second chamber on demand, an accumulator capable of storing a predefined volume of fluid at an accumulator reaction pressure, an accumulator charge valve to allow the predefined volume of fluid to be stored in the accumulator, an accumulator discharge valve to allow the predefined volume of fluid to be released from the accumulator, the method comprising:

pre-charging the accumulator to a first pressure that allows the pre-defined volume of fluid to be stored in the accumulator under the first chamber reaction pressure produced when at least one of the second force is greater than the second load and the second hydraulic energy is applied in combination with the second load;

displacing the second volume of fluid at the second pressure with the hydraulic pump;

opening the at least one displacement control valve to the second chamber to direct the second volume of fluid to the second chamber while closing the at least one displacement control valve to the first chamber to divert fluid flow from the first chamber to the accumulator charge valve; and opening the accumulator charge valve to allow the accumulator to store the pre-defined volume of fluid at the accumulator reaction pressure, the accumulator discharge valve being closed.

26. The method of claim 25, further comprising closing the accumulator charge valve after the pre-defined volume of fluid is stored in the accumulator.

27. The method of claim 26, further comprising:

opening the accumulator discharge valve at a time of high demand for hydraulic energy to release the predefined volume of fluid stored in the accumulator; and applying the accumulator reaction pressure to the pump inlet to reduce a load on the hydraulic pump.

28. The method of claim 26, further comprising:

opening the accumulator discharge valve at a time of high demand for hydraulic energy to release the predefined volume of fluid stored in the accumulator; and applying the accumulator reaction pressure to reduce a load on the hydraulic pump.

29. The method of claim 25, wherein the second load is a retraction load resulting from an action of gravity.

30. The method of claim 25, wherein the predefined volume of fluid is a full volume of fluid contained in the first chamber of the hydraulic cylinder at a fully extended position.

31. A method of intensifying energy in a hydraulic circuit for a work vehicle, the hydraulic circuit including a hydraulic cylinder to manipulate a load, the hydraulic cylinder having a first chamber and a second chamber, the hydraulic cylinder extending against a first load under an application of a first volume of fluid at a first pressure to the first chamber, the hydraulic cylinder retracting under a second load and an application of a second volume of fluid at a second pressure to the second chamber, a first chamber reaction pressure being produced in the first chamber when the cylinder rod is retracting, a hydraulic pump to displace the first volume of fluid at the first pressure and the second volume of fluid at the second pressure, the hydraulic pump having a pump inlet, at least one displacement control valve to direct the first volume of fluid to the first chamber and the second volume of fluid to the second chamber on demand, an accumulator capable of storing a predefined volume of fluid form the first chamber at an accumulator reaction pressure, an accumulator charge valve to allow the predefined volume of fluid to be stored in the accumulator, an accumulator discharge valve to allow the predefined volume of fluid to be released from the accumulator, the method comprising:

pre-charging the accumulator to a pre-charge pressure that allows the pre-defined volume of fluid to be stored in the accumulator under the first chamber reaction pressure produced when the second hydraulic energy and the second load are applied;

generating the second volume of fluid at the second pressure with the hydraulic pump;

opening the at least one displacement control valve to the second chamber to direct the volume of fluid to the second chamber while closing the at least one displacement control valve to the first chamber to divert fluid flow from the first chamber to the accumulator charge valve; and opening the accumulator charge valve to allow the accumulator to store the pre-defined volume of fluid at the accumulator reaction pressure, the accumulator discharge valve being closed.

32. The method of claim 31, further comprising closing the accumulator charge valve after the pre-defined volume of fluid is stored in the accumulator.

33. The method of claim 32, further comprising:

opening the accumulator discharge valve at a time of high demand for hydraulic energy to release the third hydraulic energy stored in the accumulator; and applying the accumulator reaction pressure to the pump inlet to reduce a load on the hydraulic pump.

34. The method of claim 31, wherein the second load is a retraction load resulting from an action of gravity.

35. The method of claim 31, wherein the predefined volume of fluid is a full volume of fluid contained in the first chamber of the hydraulic cylinder at a fully extended position.

* * * * *